United States Patent [19]
Diener

[11] Patent Number: 5,803,680
[45] Date of Patent: Sep. 8, 1998

[54] INSTRUMENT FOR MACHINING THE SURFACE OF PARTS IN TECHNICAL CAVITIES

[75] Inventor: Jörg Diener, Oberderdingen, Germany

[73] Assignee: Richard Wolf GmbH, Knittlingen, Germany

[21] Appl. No.: 727,816

[22] Filed: Oct. 8, 1996

[30] Foreign Application Priority Data

Oct. 11, 1995 [DE] Germany .................. 195 37 812.1

[51] Int. Cl.⁶ ............................. B23C 9/00; B23Q 15/20
[52] U.S. Cl. ......................... 409/130; 356/241; 409/125
[58] Field of Search .................... 409/125, 143, 409/130; 356/241, 124, 383, 72; 600/117, 127

[56] References Cited

U.S. PATENT DOCUMENTS

| | | | |
|---|---|---|---|
| 4,588,294 | 5/1986 | Siegmund | 356/241 |
| 4,613,232 | 9/1986 | Diener | 356/124 |
| 4,660,982 | 4/1987 | Okada | 356/383 |
| 4,820,043 | 4/1989 | Diener | 356/241 |
| 4,825,259 | 4/1989 | Berry, Jr. | 356/241 |
| 5,046,845 | 9/1991 | Diener | 356/241 |
| 5,102,221 | 4/1992 | Desgranges et al. | 356/241 X |
| 5,155,941 | 10/1992 | Takahashi et al. | 409/143 |
| 5,197,540 | 3/1993 | Yagi et al. | 409/143 X |
| 5,349,940 | 9/1994 | Takahashi et al. | 356/241 |
| 5,475,485 | 12/1995 | Diener | 356/241 |
| 5,644,394 | 7/1997 | Owens | 356/241 |

FOREIGN PATENT DOCUMENTS

| | | |
|---|---|---|
| 0 602 397 A1 | 6/1994 | European Pat. Off. . |
| 28 47 561 A1 | 8/1980 | Germany . |
| 35 16 164 A1 | 11/1985 | Germany . |
| 42 41 767 C1 | 12/1993 | Germany . |
| 2 201 783 | 9/1988 | United Kingdom . |

*Primary Examiner*—William R. Briggs
*Attorney, Agent, or Firm*—Panitch Schwarze Jacobs & Nadel, P.C.

[57] ABSTRACT

The present invention relates to an instrument such as a technoscope, for machining the surfaces of for example, engine blades in normally inaccessible cavities, having a machining tool able to be simultaneously observed at the machining location with an optic, comprising an instrument shank to which a head is distally coupled, said head carrying the tool and being pivotable relative to the longitudinal axis of the instrument shank. In order to create the possibility of being able to measure damage to the surface to be machined with this instrument, a measuring tool with a measuring template is attachable to the instrument head, and with this instrument head, is pivotable into the field of view of the optic. The measuring tool may be attached to the head of the instrument in a simple manner instead of a machining tool. However the measuring template may also be arranged directly at the machining tool.

18 Claims, 5 Drawing Sheets

INSTRUMENT FOR MACHINING THE SURFACE OF PARTS IN TECHNICAL CAVITIES

BACKGROUND OF THE INVENTION

The invention proceeds from an instrument for machining the surface of parts in technical cavities having a tool able to be observed simultaneously at the machining location with an optic, comprising a shank to which a head is distally coupled, said head carrying the tool and being pivotable relative to the longitudinal axis of the instrument shank.

DESCRIPTION OF THE PRIOR ART

With the help of such instruments also known as a technoscope or borescope it is possible to carry out repairs for example on engine blades of turbine engines without having to undertake a time consuming and thus costly disassembly of the engine. To this end the engine housings of all manufacturers comprise inspection openings through which such endoscopic instruments can be introduced into the housing, so that it becomes possible to machine smaller damages, such as dents in the front or rear edges of the engine blades.

An instrument of the previously described type having a bendable head for receiving a tool, which can be precisely guided at a high working intensity is known from DE-C-4241767. With this instrument it is possible to equip an instrument head with a fitting tool and then to bring this tool coupled with the instrument to the location of the damage via an inspection opening in the engine housing. In particular with this instrument, the instrument head may be pivoted out of the extended position—i.e. the tool axis corresponds to the instrument axis, into a position different from this position. In this way tight bending is achievable and thus damage to the front and rear edges of small engine blades for example or also damage lying quite close to the housing at the tip of the engine blades may be treated.

Because of the high cost of repair of engine damage due to disassembly and reassembly or dismantling of the turbine engine the engine manufacturers, the airlines and the service maintenance companies strive to mechanically treat the engine blades in closed engines via inspection holes. However, limits are set by the engine manufacturers as to how large such damage may become so that repair may still be carried out using for example grinding tools, or it is also predetermined as to what extent of damage necessitates the replacement of the turbine blades.

It is therefore necessary to measure out the damage before machining, so as to be able to decide whether repair with subsequent machining may still be carried out. If this is the case, then the repair is carried out using the previously described instrument, whereby according to the damage present in each case, different tools are attached to the distal head of the instrument. After the machining has been effected, subsequent measuring must be carried out to see whether those predetermined limits of the engine manufacturers are still adhered to or possibly, due to the removal of too much material, the damage has become larger and no longer lies within the predetermined tolerances such that the engine blades must however be replaced.

A known device for measuring object lengths under observation by an endoscope according to DE-A-2847561 comprises a rigid or flexible measuring probe and proximally, a fibre optic which can be attached to a projector. The projection light beams distally through a transparent measuring plate provided with a measuring pattern and then through an objective having a small projecting depth of definition. Due to the projection of the measuring pattern onto e.g. damage or a fracture, the size of this may be estimated.

An adapter for optical length measurement is known from DE-A-3516164, this being detachably fastened at the front end part of an introducing connection piece of an endoscope. The adapter contains an optical arrangement for changing the lens coverage, and an index which is fastened to an optical projection arrangement. The adapter permits the length measurement of an object in that the index is projected onto that plane which contains the object to be measured.

With these devices the measure being read off must in each case be converted into the real measure taking account of the object distances or the magnification of the optic, whereby apart from easily made reading errors, a further source of errors arises.

There is also a further disadvantage in that with measurement with such devices and subsequent machining of the damage, two instruments are required for the machining, or rather the machining instrument must be additionally equipped with measuring attachments or projection devices according to the solutions of the prior art, which may for example, in the case of the use of adapters, also lead to the instrument for machining the surface no longer be applied as directed.

SUMMARY OF THE INVENTION

It is therefore the object of the invention to give the possibility as to how the previously described instrument for machining surfaces can be so designed in a simple way and manner using simple means, such that damages to for example engine blades in turbine engines may be directly measured.

This object is achieved in that the previously mentioned instrument is characterized by a measuring template pivotable in the field of view of the optic. This measuring template is pivoted together with the instrument head and can therefore be put against the position of the surface to be machined or at least be brought into the proximity of this surface, so that the measuring template as well as the machining location may both be observed at the same time via the optic of the instrument and the dimensions of damage may be measured under view directly by the user of the instrument using the calibrated measuring template.

The measuring template may be provided at a separate measuring instrument which may be interchanged with the machining tool, for the purpose of which both tools then comprise uniform means for its fastening to the head of the instrument.

Otherwise there is also the possibility of directly mounting the measuring template to the machining tool so that there results a combined machining and measuring tool with which the damage may be machined as well as measured.

Further advantageous features of the instrument according to the invention are specified in the dependent claims and are hereinafter described in more detail by way of the embodiment examples shown in the drawings. These show:

DETAILED DESCRIPTION OF THE PREFERRED EMBODIMENTS

Figure 1:
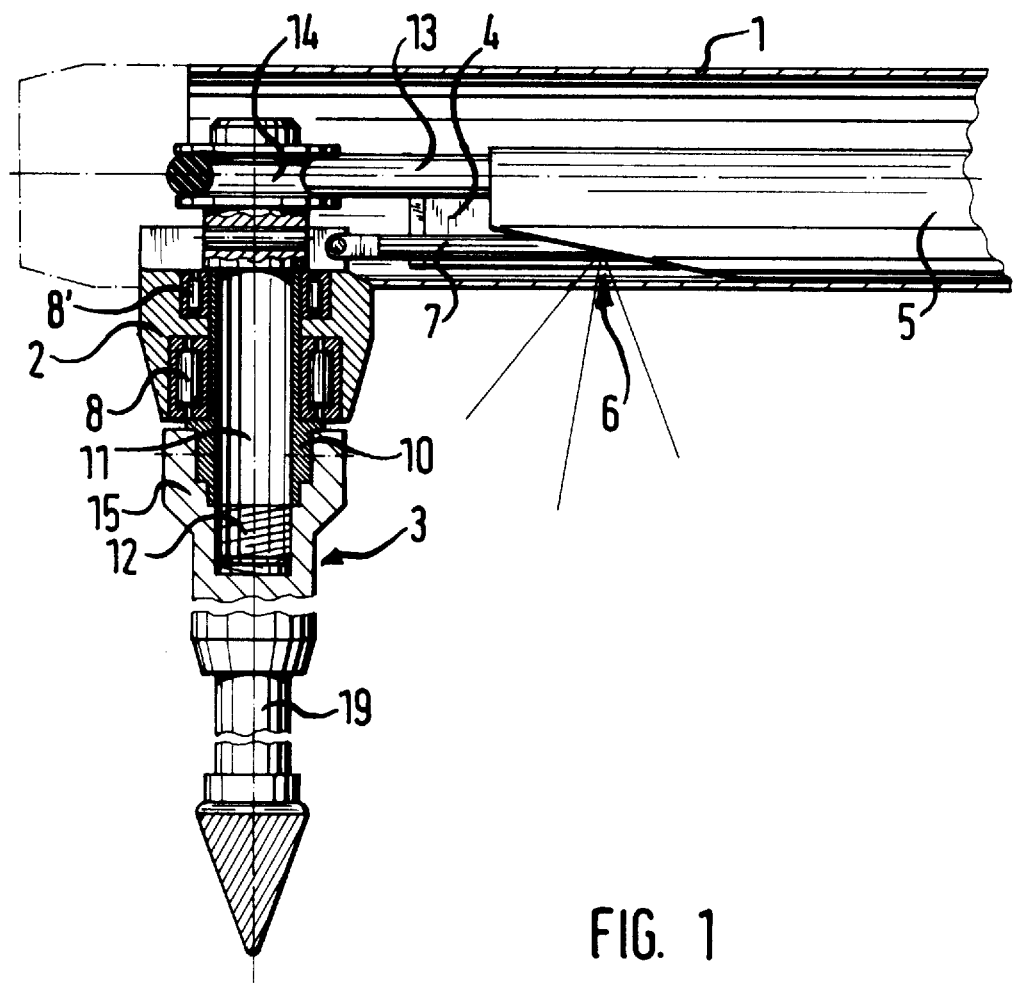
FIG. 1 the distal end of an instrument according to the invention with a machining tool attached thereto, shown partly in section, FIG. 2 a representation essentially as FIG. 1, with a first embodiment form of a measuring tool according to the invention, FIG. 3 a plan view in the direction III—III of FIG. 2, FIG. 4 the measuring instrument according to FIGS. 2 and 3, in use, FIG. 5a to 5d various advantageous formations of the measuring tool according to the invention, FIG. 6 and FIG. 7 embodiment forms of the machining tool with a measuring template rigidly attached thereto, FIG. 8 a plan view of the end of the combined machining and measuring tool according to FIG. 6 in the viewing direction VIII, FIG. 9 a plan view of the end of the combined machining and measuring tool according to FIG. 7 in the viewing direction IX, FIG. 10 a further embodiment example of a combined machining and measuring tool and FIG. 11 and 12 lateral views of the measuring tools according to FIG. 2.

As can be deduced from FIG. 1, the instrument according to the invention comprises a tubular shank 1 with a head 2 which is attached to the distal end of said instrument and able to be equipped with an interchangeable machining tool 3.

The shank 1 comprises a lumen 4 which reaches to the region of the distal end of the shank, and a technoscope shank 5 for guiding which receives an optic. In the end region of the shank 5 there is provided a lateral window 6 which, in the case of a rigid technoscope, permits the free external view of a side viewing optic, and in the case of a flexible technoscope with a controllable tip, serves as an exit opening. The instrument comprises adjusting means 7 which are coupled to the head 2 and serve to pivot the head 2 with the machining tool 3 fixed thereto from an insertion position into the represented working position, as is known from DE-C-4241767.

A spindle 11 is supported in ball and sliding bearings 8, 8' via a bearing bush 10 in the head 2, the axis of the spindle coinciding with the longitudinal axis of the head 2. At the distal side the spindle 11 projects from the head 2 and ends here at a threaded connection 12 which serves for fastening the respective tool 3. The drive of the machining tool is effected in the known manner by a motor lying on the proximal side, but is not shown, whereby the power transmission is effected with an endless belt 13, which drives the spindle 11 via a pulley 14.

A head 15 is so formed at the proximal end of its shank 19 at the machining tool 3 which is formed for example as a bevelled cutter, that this head comprises a first internal thread which corresponds to an outer thread at the distal end of the bearing bush 10 and can be screwed onto this outer thread. Moreover, the head 15 is screwed to the threaded connection 12 of the spindle 11 using a second internal thread.

Figure 2:
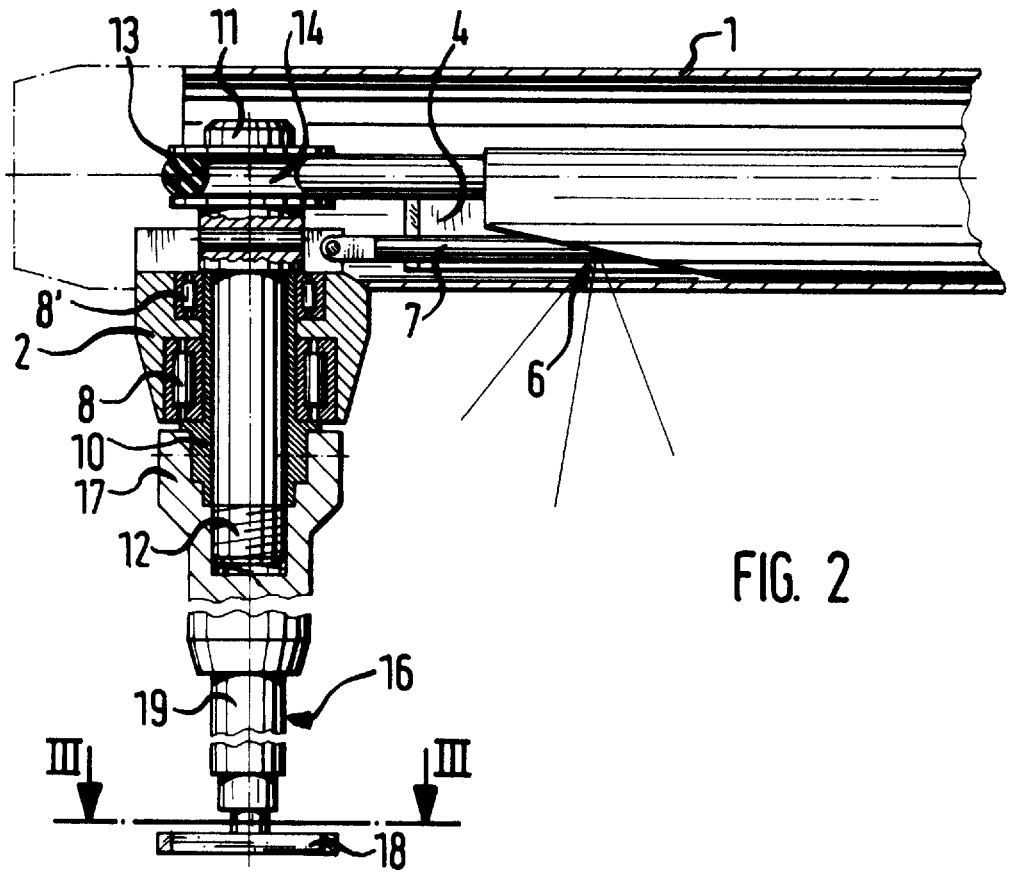
Figure 3:
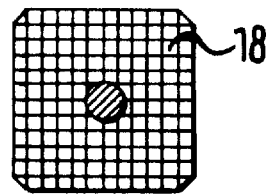

As is recognisable from FIG. 2, the machining tool 3 according to FIG. 1 is replaced by a measuring tool 16. The measuring tool 16 also comprises a head 17 at the proximal end of a shank 19, the head being formed according to the previously described tool head 15 and thus can also be screwed onto the threaded connection 12 of the spindle 11. With this screw connection, the machining tools and measuring tools may easily be exchanged with each other. The distal end part 18 of the measuring instrument 16 comprises for instance, as seen from FIG. 3, a chequerboard pattern and forms a measuring template.

The application of the instrument according to the invention is hereinafter explained by way of FIG. 4 and is, as a rule, the same for all embodiment forms of the measuring instrument described hereinafter.

Figure 4:
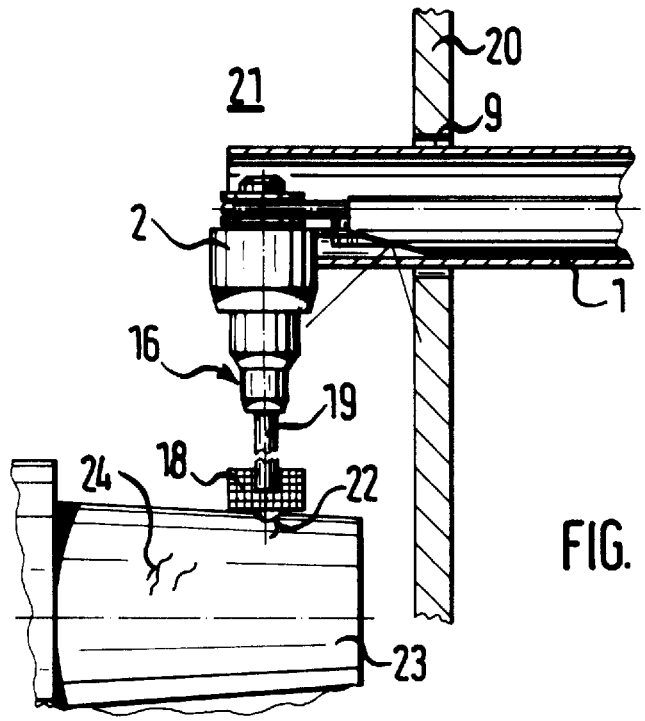

FIG. 4 shows the distal end of an instrument according to the invention, said instrument being introduced through the inspection opening 9 of a housing 20 of a turbine engine 21. The instrument is already located in the measuring position, and the template 18 of the measuring instrument 16 lies at the location of damage 22 of a turbine blade 23.

Previously, the instrument is first equipped with the measuring tool 16 outside the turbine 21 and then introduced through the inspection opening 9 in the turbine housing 20 in the introduction position, i.e. with an extended instrument head 2 and measuring tool 16. The head 2 is then bent and thus the measuring instrument 16 is pivoted into the field of view of the observation optic and the template 18 of this measuring instrument is placed next to damage 22 to the engine blade. With the measuring template 18 having the calibrated partitions, the damage can then be optically measured and on the basis of the manufacturer's standards, it can be decided whether a local repair is possible or the blade 23 has to be completely renewed. If a machining can be effected, then the instrument, in the position with the head 2 and measuring tool 16 being flush with the shank 1, is removed from the turbine through the inspection opening 9, the measuring tool 16 is replaced by a machining tool 3 and the instrument is again introduced in the known manner.

After the machining, similar to the described procedure, the machining tool and measuring tool may again be exchanged back, and, as already mentioned, renewed measuring is carried out and then it can be decided on the success of the repair.

Damage to the engine blades may not only occur at the edges, but also over the surface, e.g. by melting damage on the metal, or fractures 24 may have formed. The measuring and machining of this damage is also effected as has been described, but other measuring tools may be required. It can be deduced from FIGS. 5a to 5d that various types of measuring tools or measuring templates 25, 26, 27 and 28 are at the distal end.

The measuring template 25 embodies a modification of the measuring template 18 and also has essentially a chequerboard pattern 25a as a measuring scale. With this embodiment form however, one edge is provided with teeth 25b and recesses 25c. This measuring instrument 25 may principly be applied for measuring lengths and surfaces. Moreover the depth of fractures may also be estimated. With winding fractures this embodiment form may also be advantageous, because for example the fracture is not hidden in a stepped manner since in roughly runs sectioned under the measuring template, but through the recesses 25c and teeth 25b always becomes visible again, of which the length and width may e.g. be 1 mm.

Figure 5A:
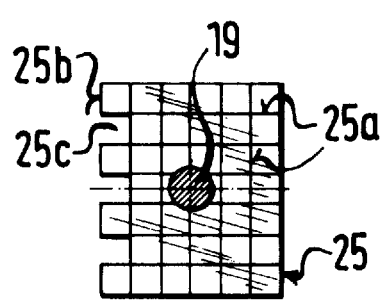
Figure 5B:
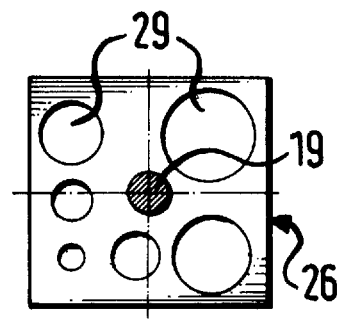
Figure 5C:
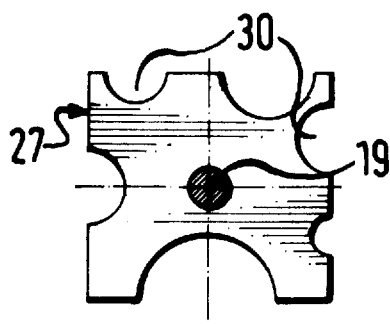

The measuring templates 26, 27 according to FIGS. 5b and 5c comprise bores 29 or radii 30 each having a differently calibrated size, and are particularly advantageous in measuring rounded dents and surface defects. Length measurements are also possible with this.

Figure 5D:
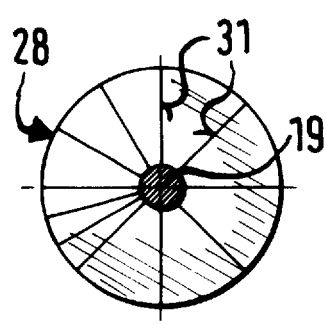
Figure 7:
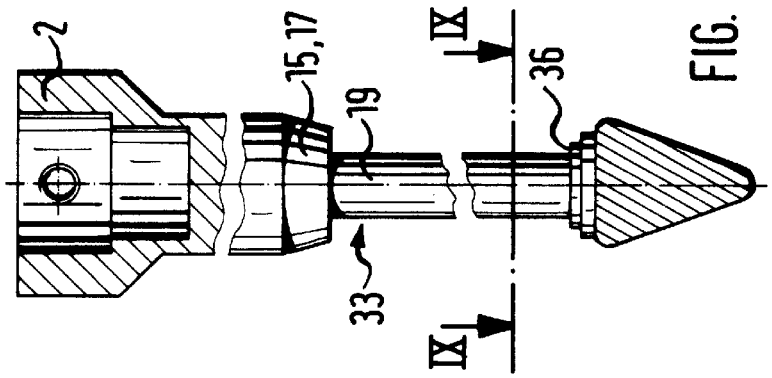
Figure 9:
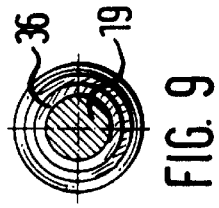

Finally, the measuring template 28 of FIG. 5d has a degree graduation 31 and is particularly applied when measuring angles for instance between crossing fractures or for measuring other damage. It is clear that a measuring template may also comprise a combination of two or more graduations, scales and configurations according to FIGS. 5a to 5d.

It may also be an advantage with particular damage to provide a combination of machining tool and measuring tool. FIGS. 6 to 10 show such tools 32, 33 and 34. As can be seen from the plan view according to FIGS. 8 and 9, on the upper side the tools 32, 33 carry measuring templates in the form of measuring scales 35, 36. These tools are primarily advantageously applied in measuring and machining rounded damage as with that damage 22 in FIG. 4, since the scale can be directly inserted into the damage. As FIGS. 6 and 7 further show, the scales may be formed planar (scale 35) or raised (scale 36).

Figure 10:
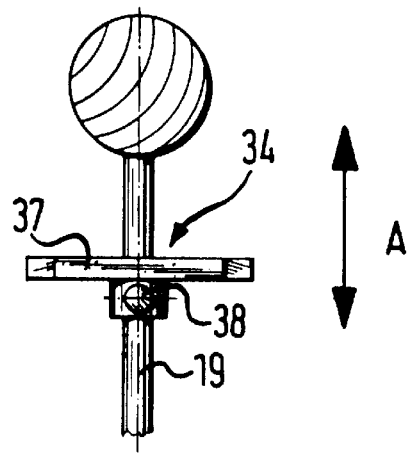

The combination tool 34 according to FIG. 10 differs from that of the previous embodiment forms in that respective measuring templates or measuring scales are attached to a carrier 37 which is longitudinally displaceable on the shank 19 of a machining tool as is seen by the arrow A in FIG. 10, and which can be fastened to the tool shank 19 for example using a screw 38.

Figure 11:
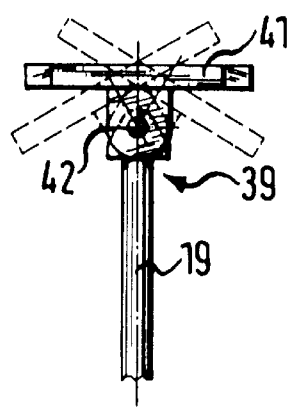
Figure 12:
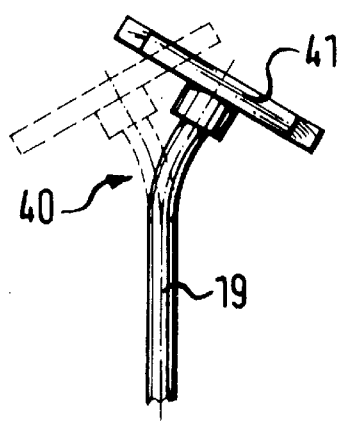

FIGS. 11 and 12 show measuring tools 39 and 40 which are particularly designed for measuring damage on inclined or uneven surfaces. With these measuring instruments a measuring scale carrier 41 is distally arranged and is deflectably arranged to the axis of the head 2 of the instrument. For this, with the measuring instrument 39, the measuring scale carrier 41 is connected to the tool shank 19 by a link 42. With the measuring instrument 40 according to FIG. 12, the tool shank 19 is designed flexible or semiflexible over a short distal piece, so that the scale carrier 41 can be adapted to all directions of inclined surfaces.

In a further form, the scale carriers, which in themselves form measuring templates or carry these, are manufactured from elastic material by which means they can be adapted to concave or convex surfaces. A manufacture from transparent material or with partly transparent surfaces in combination with the tool carrier 37 according to FIG. 10 may be particularly advantageous, since due to the transparence even large measuring templates would not inhibit the view of the tool or machining location. Moreover, as a rule, damage and fractures would not be hidden by the scale carrier or template partitions.

Otherwise, instead of the measuring scale carrier 41, grinding discs for example may be attached to the tool shank which may be provided with a measuring template on the side facing the tool shank, as with FIGS. 6 to 9, so that the tool is suitable for machining as well as measuring.

Furthermore, with the embodiment forms according to FIGS. 2 to 5 and 10 to 12, sections transparent to light as well as opaque sections may be provided.

Otherwise the scales or templates of the measuring tools may be calibrated in a certain graduation, for example in mm, inches or other measure, and inscribed accordingly.

In a further advantageous design, a measuring template may be provided in which it is coupled to the machining tool 3 or the head 2 in such a manner that on pivoting the machining tool 3 from the working position, the measuring template moves into the field of view.

Figure 6:
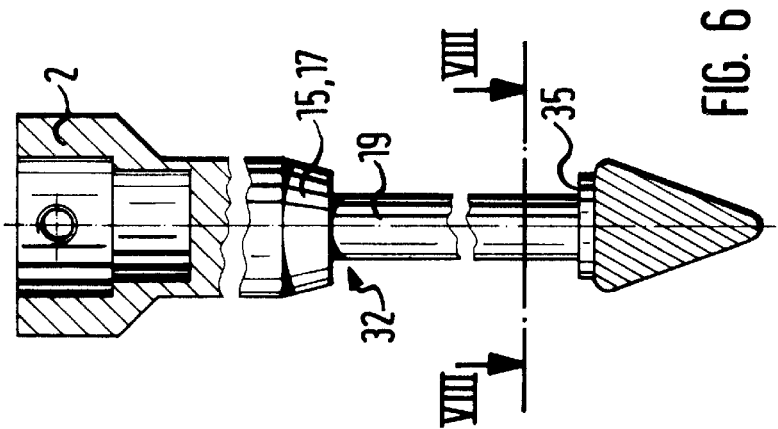
Figure 8:
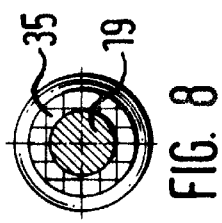

With such a combination the change between the machining tool and the measuring template, as also with the embodiment forms according to FIGS. 6 and 10, can be dispensed with.

What is claimed is:

1. An instrument for machining a surface of parts in technical cavities and simultaneous observation of the surface at a machining location with an optic, comprising a shank (1) having a longitudinal axis, an instrument head (2) attached to a distal end of the shank, the instrument head pivoting relative to the longitudinal axis of the shank, a tool (3,16, 32–34) carried by the head, and a measuring template adapted to be carried by said instrument head or said tool (18, 25–28) which is pivotable into a field of view of the optic.

2. An instrument according to claim 1, characterized in wherein the tool is a measuring tool (16) that is equipped with the measuring template (18).

3. An instrument according to claim 1, characterized in that the tool is a machining tool (3).

4. An instrument according to claim 2, characterized in that the measuring tool (16) comprises a shank head (17) at the proximal end of a tool shank (19), said shank head (17) being compatible with a tool head (15) of the tool, and said tool head (15) including means for fastening to the instrument head (2).

5. An instrument according to claim 2, characterized in that the measuring template (18) is provided at the distal end of the shank (1)) of the measuring tool (16) perpendicular to the shank axis.

6. An instrument according to claim 2, characterized in that the measuring template (18) is pivotably mounted at the distal end of the shank (19) of the measuring tool (39).

7. An instrument according to claim 2, characterized in that the shank (19) of the measuring tool (40) is flexibly formed.

8. An instrument according to claim 1, characterized in that a measuring template (35, 36) is attached to the shank (19) of the machining tool (3).

9. An instrument according to claim 8, characterized in that the measuring template (35, 36) includes means for displaceably attaching to the shank (19) of the tool (3).

10. An instrument according to claim 8, characterized in that the measuring template (35, 36) is rigidly attached to the shank (19) of the tool (3).

11. An instrument according to claim 8, characterized in that the measuring template (35, 36) includes parts which are transparent.

12. An instrument according to claim 2, characterized in that the measuring template (18, 25) comprises a flat, chequerboard type pattern of strips being orthogonal to one another, and at a fixed mutual distance.

13. An instrument according to claims 1, characterized in that the measuring template (26, 27) comprises circular or semicircular cutouts (29, 30) with various radii for measuring circular arcs and diameters.

14. An instrument according to claim 13, characterized in that the measuring template (26) comprises circular openings (29) in a quadratic disc.

15. An instrument according to claim 13, characterized in that the measuring template (27) comprises semicircular cutouts (30) of various radii at the peripheral outer edges of a rectangular disc.

16. An instrument according to claim 1, characterized in that the measuring template (28) is formed as a circular disc with angular graduations (31).

17. An instrument according to claim 1, characterized in that the measuring template comprises alternating light reflecting and light absorbing sections.

18. An instrument according to claim 1, characterized in that the measuring template is flexible.

* * * * *